March 16, 1965  A. U. BRYANT  3,173,649
BALANCED SEALING MEANS
Filed Sept. 21, 1960  2 Sheets-Sheet 1
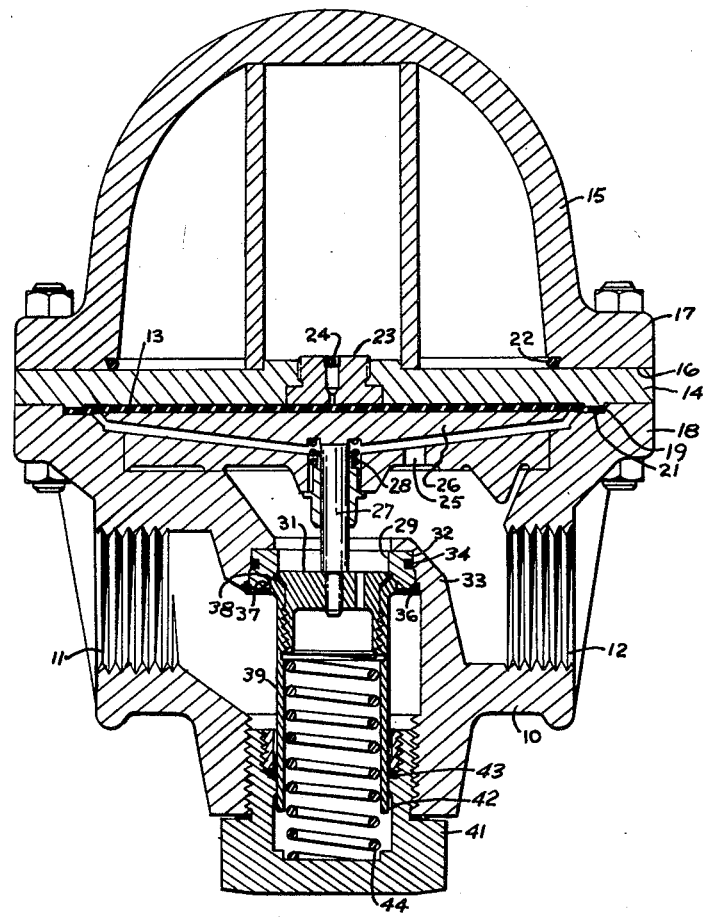
FIG_1
INVENTOR.
Austin U. Bryant.
BY
ATTORNEYS

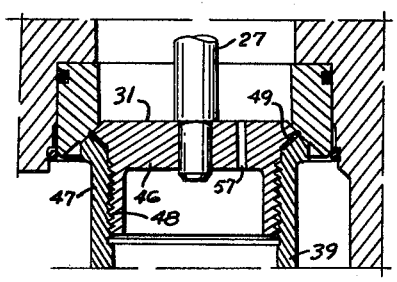
FIG_2
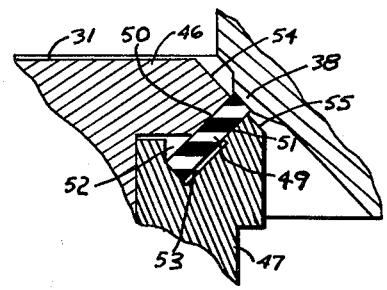
FIG_3
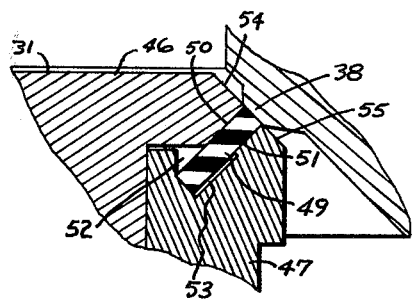
FIG_4
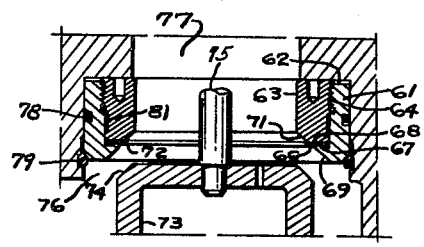
FIG_5
INVENTOR.
Austin U. Bryant
BY
ATTORNEYS 3,173,649
BALANCED SEALING MEANS
Austin U. Bryant, Walnut Creek, Calif., assignor to Grove
 Valve and Regulator Company, Oakland, Calif., a corporation of California
Filed Sept. 21, 1960, Ser. No. 57,510
7 Claims. (Cl. 251—282)

This invention relates generally to fluid flow control devices of the type making use of a valve member movable in opposite directions and having a valve working surface seating on a valve working surface formed in the valve body.

Many valves and flow regulating devices employ resilient sealing members or inserts, formed of a material like synthetic rubber, neoprene, Teflon, Kel-F, nylon or the like. In some instances metal to metal valve working surfaces are provided in conjunction with seal members or inserts formed of resilient material. Such a construction is shown in Gannon 2,485,092, where the resilient seal member is in the form of a relatively thin annulus that is clamped between cooperating parts forming a valve seat assembly. In constructions such as disclosed in said patent it has been found that application of relatively high fluid pressure differentials may cause the resilient seal member to be displaced from between the cooperating clamping parts. This causes leakage, either due to uneven contact of a peripheral edge of the seal member with the adjacent cooperating valve surfaces, to pinching effects or to partial or complete dislodgement of the seal member.

In general it is an object of the present invention to provide a valve or flow control device of the general type which utilizes a resilient seal member in the form of a relatively thin annulus, but which mounts such annulus in such a manner that relatively high applied pressure differential does not tend to cause the seal member to be displaced or dislodged.

Another object of the invention is to provide an improved valve assembly of the above character which serves to prevent objectionable pinching of the resilient seal member.

Additional objects and features of the invention will appear from the following description in which the preferred embodiments have been set forth in detail in conjunction with the accompanying drawing:

Referring to the drawing:
FIGURE 1 is a side elevational view, in section illustrating a pressure reducing regulator incorporating my invention.
FIGURE 2 is en enlarged detail in section illustrating the construction of the valve parts.
FIGURE 3 is an enlarged detail in section illustrating the parts as the valve assembly approaches fully closed position.
FIGURE 4 is a view like FIGURE 3 but showing the parts in fully closed position.
FIGURE 5 is a detail in section illustrating another embodiment in which the resilient sealing member is carried by a stationary seat assembly.

The device illustrated in FIGURE 1 is a pressure reducing regulator of the type disclosed in Grove 2,177,825. This regulator consists of a body 10, provided with the inlet and outlet flow passages 11 and 12. The body serves to mount the flexible diaphragm 13, the rigid dome plate 14, and the loading dome 15. The outer margin 16 of the dome plate 14 is clamped between the flanges 17 and 18, formed respectively on the dome and the body. The flexible diaphragm has a margin 19 which is clamped between an annular portion of the dome plate, and the annular face 21 formed on the body. Sealing means 22 of the resilient O-ring type is shown between the dome and the plate 14. The dome plate carries a fitting 23, which is provided with a small control orifice 24, corresponding to the orifice 30 of said Patent 2,177,825.

A diaphragm plate 26 underlies the diaphragm, and engages the valve operating rod 27. Spring 28 urges the diaphragm plate upwardly against the diaphragm.

Normally the dome is loaded with gas under pressure, which is introduced or vented out through siutable needle valves and fittings (not shown). The lower side of the diaphragm is exposed to downstream pressure applied through the tube 25.

The flow control means which is actuated by the diaphragm, includes the stationary seat ring 29, together with the movable valve member assembly 31. In this instance the resilient seal member is incorporated in the movable valve member assembly.

The seat ring 29 is formed of suitable metal, and is removably seated within a recess 32 formed in the bridge 33 of the valve body. It is sealed with respect to the body by suitable means such as a resilient seal ring 34 of the O-ring type. It is held in place by suitable means such as the snap-in ring 36. It is machined to provide the generally conical valve working surface 37, which may be a simple conical surface, or a surface such as shown in FIGURE 3 which is machined to provide an annular ridge 38.

The valve member assembly 31 includes a depending sleeve 39, which performs a balancing function, and which interfits a bore formed in the body. Thus a fitting 41 is threaded into the body, and is formed to provide a bore 42 which accommodates the sleeve 39. Sealing means 43, such as one of the O-ring type, forms a fluid tight seal about the sleeve. Compression spring 44 urges the valve assembly toward the stationary seat ring 29.

Referring to FIGURE 2, the valve assembly consists of the two parts 46 and 47, which in this instance are attached together by means of the threaded connection 48. The part 47 is formed integral on the upper end of the sleeve 39. The resilient seal member 49 is an annulus conforming generally to a truncated cone, and is clamped between the parts 46 and 47. It will be noted that the machining of the parts 46 and 47 provides conical shaped opposed clamping faces 50 and 51, which clamp upon opposite sides of the seal member 49 in regions near (i.e. just short of) its outer peripheral edge. In addition the machining is such as to provide clearance spaces 52 and 53 adjacent the inner peripheral margin of the seal member. As shown in FIGURE 3, the outer peripheral edge portion of the seal member 49 projects a short distance beyond the adjacent conical surfaces 54 and 55 formed respectively upon the members 46 and 47. Also the end face, or the outer peripheral surface of the seal member 49, conforms to a cone and in section extends at right angles to the side surfaces.

As shown in FIGURE 1, one end of the operating rod 27 is socketed within the part 46 of the valve assembly. Also part 46 is shown provided with a vent 57, whereby the space within the shell 39 is in fluid pressure communication with the downstream side of the regulator. Because the space within the shell 39 is in communication with the downstream side of the regulator, the spaces 52 and 53 are likewise in such relationship by virtue of communication through the threaded engagement 48, which is unsealed.

Operation of the device described above is as follows: As is well known to those familiar with the operation of pressure reducing regulators, the regulator shown in FIGURE 1 will maintain a substantially constant downstream pressure at a pressure level depending upon the loading, or in other words, depending upon the pressure maintained within the dome 15. During operation, and depending upon variations such as changes in the demand on the downstream side, and changes in the pressure applied to the upstream side, the valve assembly 31 is moved by the diaphragm to control the fluid flow. When the valve assembly moves to full closed position, the outer peripheral surface of the seal member 49 first contacts the surface of the ridge 38, in the manner shown in FIGURE 3, and thereafter further movement to closed position causes a compression of the outer portion of seal member 49, until metal to metal contact is established, as shown in FIGURE 4. This compression makes for an absolute fluid tight seal capable of holding relatively high applied fluid pressure differential. Insofar as the flexible member 49 is exposed to fluid pressure, the pressure tends to urge this member inwardly with respect to the cooperating parts 46 and 47, instead of tending to cause its dislodgement. This is because the portion of the seal member 49 that is exposed within the spaces 52 and 53, is exposed to downstream pressure, whereby pressure applied to the outer edge portion tends to urge the seal member inwardly. While the ridge 38 is not essential, it is advantageous in that it facilitates maintenance of a desired balance for the valve member assembly.

In the embodiment of FIGURE 5, the seat is formed by the assembly 61, which includes the two annular parts 62 and 63, which have threaded engagement 64. A relatively thin and substantially planar resilient member 66 is clamped between the flat faces 67 and 68 formed respectively upon the parts 62 and 63. The metal surfaces 69 and 71, formed respectively upon parts 62 and 63, conform to a cone and form metal valve working surfaces. Resilient member 66 has its inner peripheral portion 72 projecting a short distance from the surfaces 69 and 71, whereby it engages the cooperating valve working surface of a movable valve member.

The movable valve member 73 may likewise be of the balance type, and is operatively connected to the rod 75. Its valve working surface 74 is conical shaped, and adapted to cooperate with the surfaces 69 and 71 of the seat assembly. When in use the passage 76 connects with the upstream or high pressure side, and passage 77 connects with the downstream or low pressure side. The part 62 of the seat assembly is sealed with respect to the body by suitable means such as the seal ring 78 of the resilient O-ring type. Normally the seat assembly is held in place by the snap-in ring 79. Because the threaded engagement 64 is not sealed, the annular space 81 and also the region immediately surrounding the outer periphery of the seal member 66, are in communication with the downstream passage 77.

When the valve shown in FIGURE 5 is closed, conical surface 74 first contacts the inner peripheral edge 72 of the seal member 66, and thereafter this peripheral portion of the seal member is compressed until surface 74 seats upon the metal valve working surfaces 69 and 71. In such condition the valve is sealed against leakage. The fact that the outer peripheral portion of the seal member is exposed to the lower pressure on the downstream side, avoids any possible dislodgement of the seal member under various operating conditions.

I claim:

1. In a device for controlling fluid flow, annular stationary seat means, annular valve means aligned with the axis of the seat means and movable along said axis toward and away from the seat means between closed and open positions, both of said means forming cooperating metal valve working surfaces, one of said means comprising an assembly including two annular parts, said parts being formed to provide opposed annular clamping faces, a relatively thin elongated annular seal member formed of resilient material having its elongated side portions disposed and clamped between said faces against leakage therebetween, with a peripheral edge portion of the seal member projecting for sealing contact with the valve working surface of the other one of said means, said assembly being formed to establish fluid pressure communication between the region at the other peripheral edge portion of the resilient seal member and said downstream side of the device to provide a pressure differential across said seal member between said projecting peripheral edge and said other peripheral edge when said projecting peripheral edge is exposed to upstream pressure while the clamping engagement of said clamping faces against the sides of said seal member prevents entry of upstream pressure to said region at the other peripheral edge portion, said other peripheral edge portion being in fluid-tight isolation from the upstream side of the device.

2. In a device for controlling fluid flow, an annular seat ring, a movable valve assembly aligned with the axis of said seat ring and movable towards and away from the seat ring between closed and open positions, the side of said seat ring away from said valve assembly being the downstream side of the device, both the seat ring and said valve assembly providing cooperating metal valve working surfaces that are generally conical shaped, said valve assembly comprising two annular parts formed to provide opposed annular clamping faces, a relatively thin elongated annular seal member formed of resilient material having its elongated side portions disposed and clamped between said faces against leakage therebetween, said seal member having a peripheral edge of the same projecting for sealing contact with the valve working surfaces of the seat ring, duct means opening at the leading end of said valve assembly in the portion embraced by said seal member to establish fluid pressure communication between the region at the other peripheral edge portion of the seal member and the downstream side of the device to provide a pressure differential across said seal member between said projecting peripheral edge and said other peripheral edge when said projecting peripheral edge is exposed to upstream pressure while the clamping engagement of said clamping faces against the sides of said seal member prevents entry of upstream pressure to said region at the other peripheral edge portion, said other peripheral edge portion being in fluid-tight isolation from the upstream side of the device.

3. A device as in claim 2 in which said opposed annular clamping faces are substantially conical and in which said seal member is substantially conical.

4. A device as in claim 1 in which said annular seal member is of substantially rectangular cross section and in which said peripheral edge portion is formed by a narrow side thereof.

5. A device as in claim 4 in which said assembly forms the movable valve means.

6. A device as in claim 4 in which said assembly forms the stationary seat means.

7. A device as in claim 4 in which said opposed annular clamping faces are conical shaped, and in which said seal member is conical shaped and clamped between said conical shaped faces.

References Cited by the Examiner
UNITED STATES PATENTS

| | | | |
|---|---|---|---|
| 1,689,095 | 10/28 | Wray | 251—333 |
| 2,485,092 | 10/49 | Gannon | 251—357 XR |
| 2,542,390 | 2/51 | Brown. | |
| 2,630,292 | 3/53 | Skweir | 251—282 |
| 2,845,945 | 8/58 | Mancusi | 251—332 XR |
| 2,861,773 | 11/58 | Clade | 251—315 |
| 2,918,078 | 12/59 | Cummings | 251—333 XR |
| 3,053,501 | 9/62 | Varga | 251—332 |

FOREIGN PATENTS

| | | |
|---|---|---|
| 1,091,327 | 4/55 | France. |
| 1,214,285 | 4/60 | France. |

ISADOR WEIL, *Primary Examiner.*

MARTIN P. SCHWADRON, *Examiner.*